July 4, 1933.  J. H. BOOK  1,917,088
GRADING MACHINE
Filed April 29, 1931  2 Sheets-Sheet 1
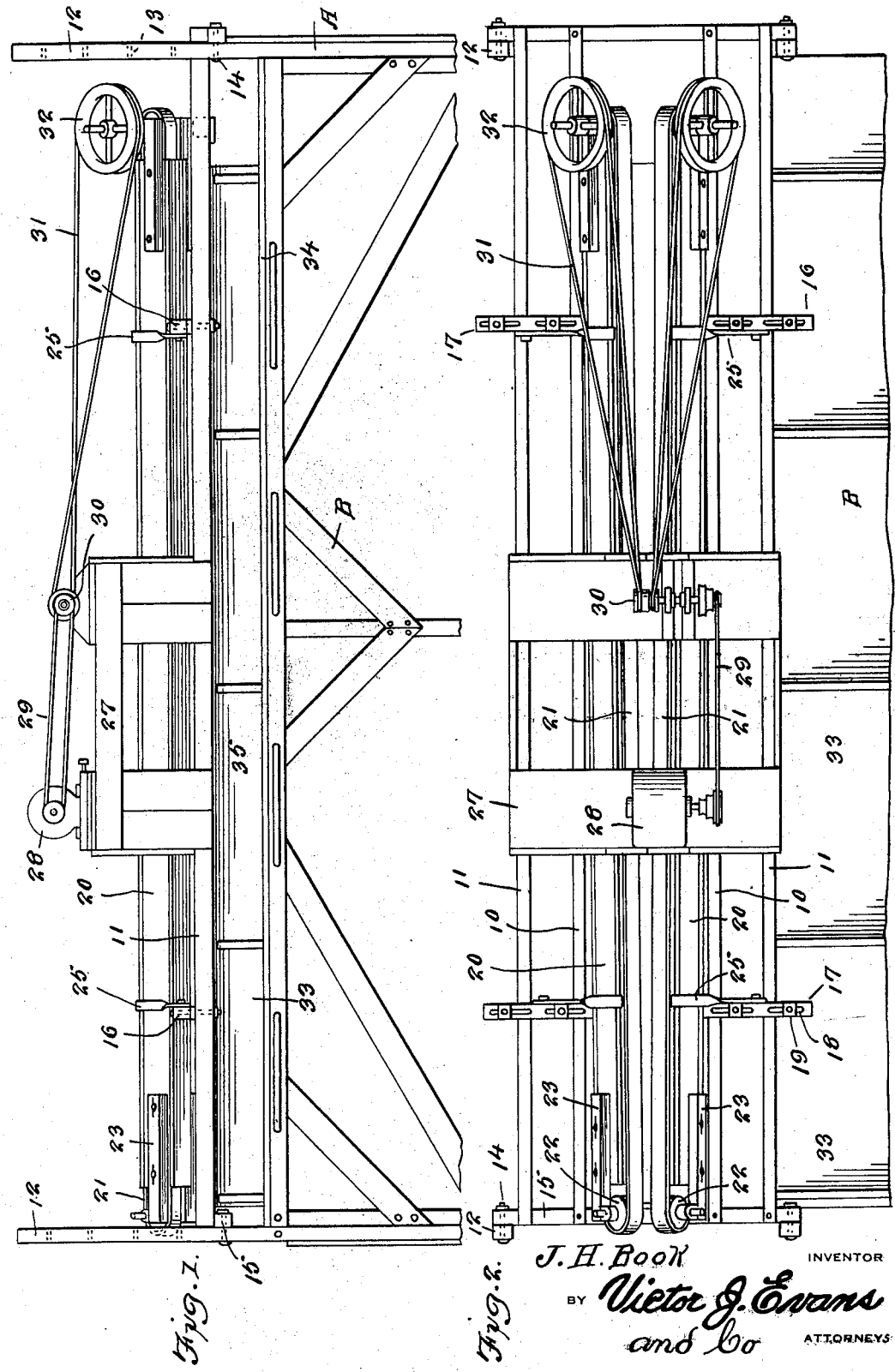

July 4, 1933.  J. H. BOOK  1,917,088
GRADING MACHINE
Filed April 29, 1931   2 Sheets-Sheet 2
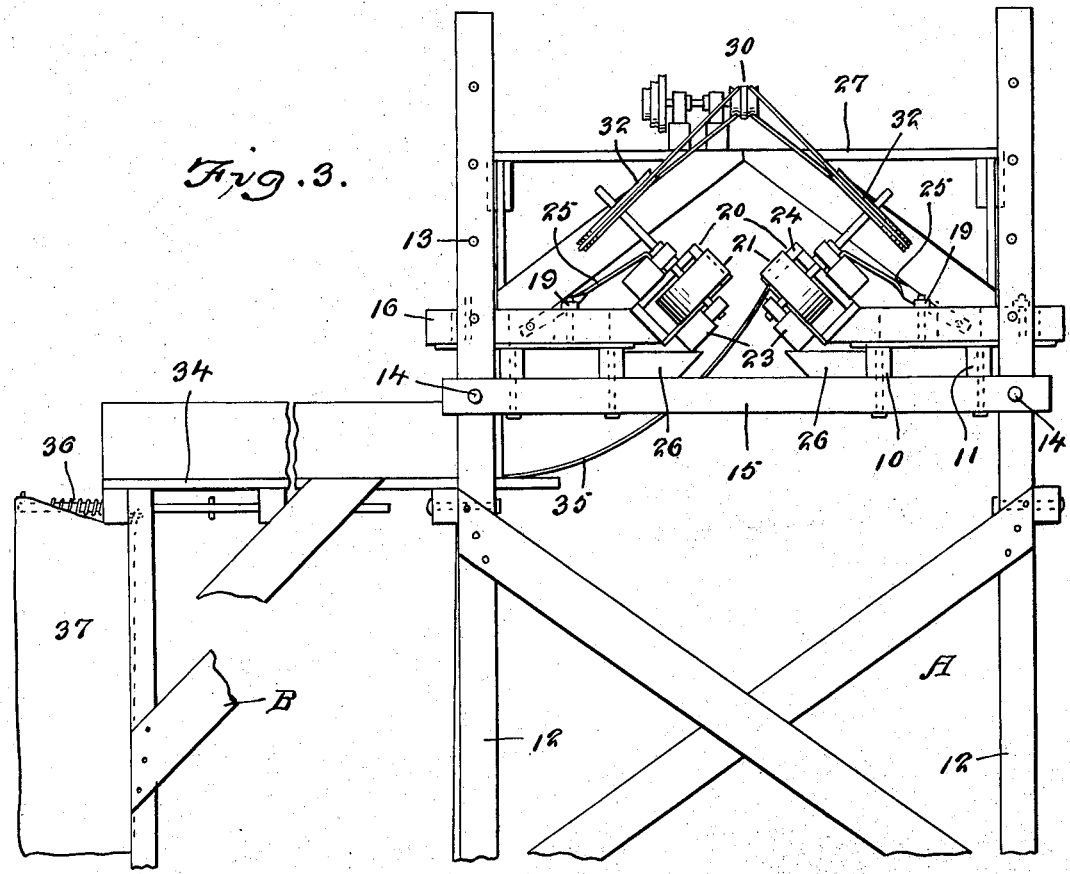
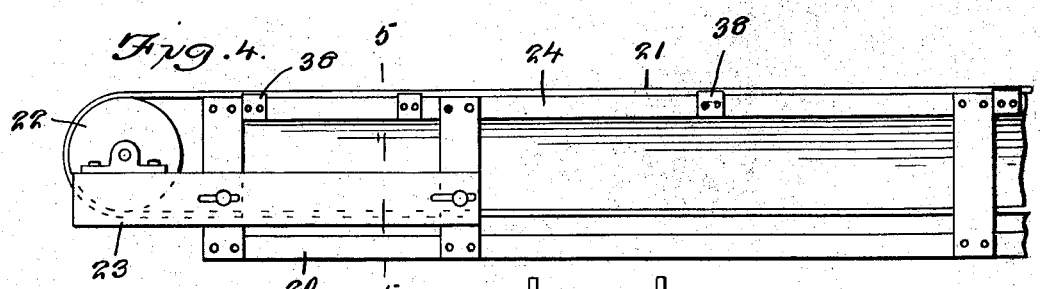
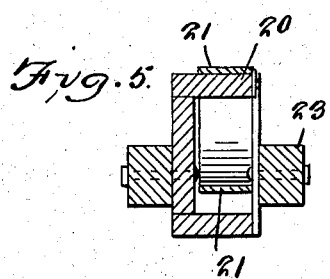
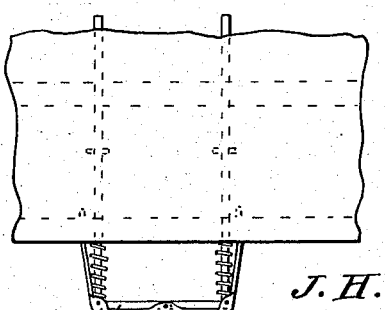
J. H. Book
INVENTOR
BY Victor J. Evans and Co
ATTORNEYS Patented July 4, 1933

1,917,088

UNITED STATES PATENT OFFICE

JOHN H. BOOK, OF LANCASTER, PENNSYLVANIA

GRADING MACHINE

Application filed April 29, 1931. Serial No. 533,779.

The invention relates to grading machines and more particularly to that type of machine for grading fruits.

The primary object of the invention is the provision of a machine of this character, wherein the fruits are delivered to the machine at one end thereof and such fruits are automatically graded and deposited in their assorted condition into bins whereby the assorted fruits can be bagged in a convenient manner.

Another object of the invention is the provision of a machine of this character wherein the grading operation is carried forth by a pair of endless flat belts so arranged to present a trough or way for the fruits and this trough or way being graduated whereby the fruit can be graded or sorted when passing through the machine and the assorted fruits delivered into bins directly from the trough or way, these bins being at one side of the machine and are accessible for the bagging of the graded fruit.

A further object of the invention is the provision of a machine of this character, wherein the grading belts are supported so that the same can be adjusted relative to each other to increase or decrease the space therebetween as the occasion may require for the handling of fruits during the grading operation and also to permit the shaping of the space between these belts for the successive sorting of said fruits, the machine in its entirety being novel in construction.

A still further object of the invention is the provision of a machine of this character, which is comparatively simple in construction, thoroughly reliable and efficient in operation, assuring the grading or sorting of fruits with dispatch and automatically, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claim hereunto appended.

In the accompanying drawings:—

Figure 1 is a side elevation of a machine constructed in accordance with the invention.

Figure 2 is a top plan view thereof.

Figure 3 is an enlarged fragmentary end elevation thereof.

Figure 4 is a fragmentary plan view of one grading belt and its supporting assembly.

Figure 5 is a sectional view on the line 5—5 of Figure 4.

Figure 6 is a fragmentary plan view of one of the bins showing in detail a bag holder used with the machine.

Similar reference characters indicate corresponding parts throughout the several views in the drawings.

Referring to the drawings in detail the machine comprises a stand A made from a suitable frame and upon this stand is arranged pairs of spaced longitudinal inner and outer sills 10 and 11 respectively, upon which are adjustably supported opposed grading conveyors hereinafter fully described.

The end uprights 12 of the stand are provided with spaced holes 13 for accommodating selective bolts 14 which are carried by the cross pieces 15 of the stand so that the said longitudinal sills 10 and 11 may be raised or lowered on the stand or the plane of such sills may be altered whereby they may be disposed at a lateral inclination if found necessary.

Mounted at predetermined distances from the ends of the stand A upon the sills 10 and 11 to be disposed crosswise thereof are bracket supports 16, each having thereon a bracket 17, this being provided with slots 18 in which are engaged fasteners 19 mounted in the bracket supports 16 so that the said brackets 17 can be moved on the supports and fastened in adjusted position. These brackets 17 are arranged on opposite sides of the stand directly opposite each other and support the framing 20 for the grading conveyors.

The grading conveyors comprise a pair of oppositely arranged endless flat belts 21, each passing over and trained about guide pulleys 22 supported between hangers 23, one pair of the latter being adjustably connected to their companion framing 20 so that the belt 21 can be tightened or slackened as may be required for the successful operation of the machine.

The framings 20 are mounted on the brackets 17 so as to be disposed in opposed upwardly converging relation to each other and spaced apart at the longitudinal center of the stand. Each framing 20 carries a bed 24 for the inner stretch of the belt 21 which stretch passes along the outside of the bed 24, the latter being designed to prevent the sagging or twisting of this stretch of the belt when the machine is operated. The framings 20 have at their upper side connected therewith angle braces 25 while connected with the sills 10 and 11 beneath the framings 20 are lower braces 26 therefor.

On the stand A, elevated above the conveyors, is a platform 27 on which is mounted an electric motor 28 adapted for electrical connection with a source of current supply and this motor through the medium of the drive belt 29 operates a pair of pulleys 30, these being suitably supported upon the platform 27 and have trained about the same the driven belts 31 trained over driven pulleys 32 connected with a pair of the pulleys 22 at the discharge end of the machine so that motion will be transmitted from the motor 28 to the grading belts 21 as will be obvious from Figures 1, 2 and 3 of the drawings.

At one side of the stand A is a table B, the top thereof being divided into a plurality of bins or trays 33 which are arranged side by side throughout the longitudinal extent of the stand and the bottoms 34 of these bins or trays are extended inwardly a distance of the stand at one side of the same while connected with the framing 20 of the belt 21 furthest away from these bins or trays is an apron chute 35 to direct and feed fruits graded in the machine to the respective bins or trays 33 as should be clearly obvious from Figure 3 of the drawings.

At the outer side of the table A and suitably supported thereon at each bin or tray 33 is a bag holder 36 for a bag 37 so that it will be held in open position to receive the graded fruits from the bin or bins.

Each framing 20 at the belt bed 24 thereof has fitted thereto at the desired interval next to the lowest edge of the inner stretch of the belt 21 abutment cleats 38 to prevent the belt 21 working downwardly on the framing at the inner of said belt while the grading conveyors are operated in the machine.

The belts 21 which constitute the grading conveyors are arranged at the required spaced relation to each other longitudinally of the machine and disposed in a forward convergent relation to one another to effect therebetween a trough or way for fruit delivered between the belts and these belts 21 will advance the fruits in a longitudinal direction of the machine and by reason of the tapered way between said belts the different sizes of fruits will discharge from the way between the belt into the chute 35 and thence gravitate into the respective bins 33 at one side of the stand of the machine so that in this manner the fruits will be assorted to grade them according to sizes and these assorted fruits can be deposited within the bags 37 from the bins 33 for the merchandising of such fruits.

From the foregoing will be understood clearly the construction and operation of the machine and for the sake of brevity an extended explanation has been omitted.

What is claimed is:—

A machine of the character described comprising a stand constituting a frame having end uprights provided with spaced openings, cross pieces arranged at the end uprights, fasteners selectively engageable in the openings in the uprights and engaging the cross pieces for adjustment thereof, inner and outer longitudinal sills arranged in spaced pairs upon the cross pieces, bracket supports carried by the sills adjacent to opposite ends of the stand and each having a bracket provided with a slot, fasteners engaged in the supports and said slots of the brackets whereby said brackets may be moved upon the supports and fastened in adjusted position, guide pulleys, hangers for the pulleys, framings carried by the brackets and supporting the hangers, means for adjusting certain of the hangers, a pair of oppositely arranged endless flat belts trained over the pulleys and disposed longitudinally in spaced converging relation to each other at the center of the stand, each framing having a bed for the inner stretch of the belt, and abutment cleats on each bed and arranged at intervals with respect to the lowest edge of the inner stretches of the belt.

In testimony whereof I affix my signature.

JOHN H. BOOK.